United States Patent
Morioka et al.

[11] 3,937,484
[45] Feb. 10, 1976

[54] MOTORIZED TWO-WHEELED VEHICLE WITH NOVEL DISPOSITION OF FUEL TANK AND PARTS HOUSING

[75] Inventors: Minoru Morioka, Niiza; Nagatoshi Katagiri, Saitama, both of Japan

[73] Assignee: Honda Giken Kogyo Kabushiki Kaisha, Tokyo, Japan

[22] Filed: Oct. 31, 1974

[21] Appl. No.: 519,700

[30] Foreign Application Priority Data
  Nov. 2, 1973  Japan .............................. 48-122717

[52] U.S. Cl. ................. 180/33 R; 280/281; 224/35
[51] Int. Cl. ........................................... B62k 11/04
[58] Field of Search ...... 180/35, 33 R, 30; 280/281, 280/289, 202; 224/35, 32

[56] References Cited
UNITED STATES PATENTS

| | | | |
|---|---|---|---|
| 2,071,761 | 2/1937 | Nicholson | 180/33 R |
| 2,755,873 | 7/1956 | Klaue | 180/35 |
| 2,908,510 | 10/1959 | Lossau | 280/281 |
| 3,453,824 | 7/1969 | Biesecker | 180/33 R X |

FOREIGN PATENTS OR APPLICATIONS

| | | | |
|---|---|---|---|
| 521,070 | 3/1955 | Italy | 280/289 |

*Primary Examiner*—Kenneth H. Betts
*Attorney, Agent, or Firm*—Haseltine, Lake & Waters

[57] ABSTRACT

A motorized two-wheeled vehicle in which the fuel tank is supported by the frame beneath the seat and a hollow housing is mounted between the seat and the steering handle at a position above the engine. The housing has openable upper and side covers, and various parts can be contained in the housing such as an air cleaner for the carburetor of the engine, a fuel filler neck for the fuel tank, an auxiliary tank for the radiator, a casing for tools, and the like, etc.

8 Claims, 4 Drawing Figures

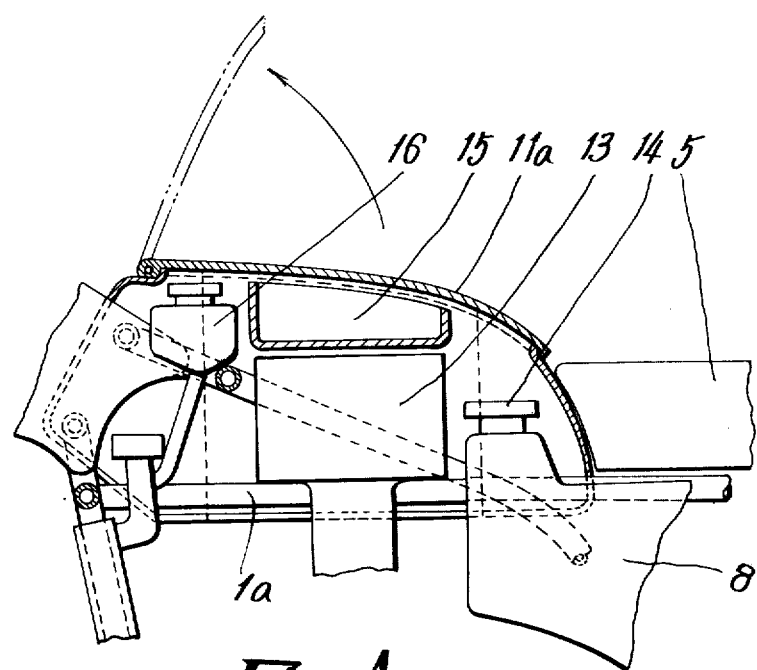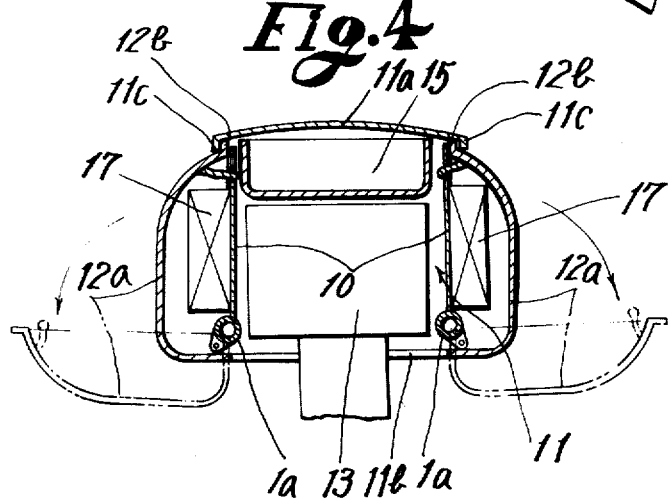

3,937,484

MOTORIZED TWO-WHEELED VEHICLE WITH NOVEL DISPOSITION OF FUEL TANK AND PARTS HOUSING

BACKGROUND a. Field of the Invention

This invention relates to a motorized two-wheeled vehicle, such as, a motorcycle or the like.

b. Prior Art

It is well known in this type of vehicle that a fuel tank is provided on an upper portion of the frame of the vehicle body so as to be positioned between the driver's seat at its rear and the steering handle at its front. Originally, it was not always required for the fuel tank to be so disposed at the aforesaid position and it is considered that the tank may be transferred to any other position.

SUMMARY OF THE INVENTION

This invention contemplates that the space made by transferring the fuel tank from its present position to any other position can be utilized to provide a housing for accommodating various parts. Namely, according to the invention, in a motorized two-wheeled vehicle of the type in which the frame of the body having a front wheel and a rear wheel, is provided at its upper middle portion with the driver's seat and at its front portion with a steering handle, it is characterized in that a housing is fixed to the frame of the vehicle body between the seat and the steering handle such that various parts can be contained therein.

It is preferable, in principle, in this type of two-wheeled vehicle that the comparatively heavy parts such as the internal combustion engine and the fuel tank are mounted at the lower portion of the vehicle body so as to lower the position of the center of gravity of the vehicle body to improve the running stability thereof. To satisfy this requirement, according to the invention, the internal combustion engine is mounted below the frame housing and the fuel tank is mounted below the seat. In this case, the internal combustion engine is preferably of the vertical opposed or V type which laterally extends left and right so as to be substantially symmetrical, and a carburetor is mounted above the engine. The foregoing frame housing is preferably composed of at least one chamber having an upper cover which can be opened upwards and is permanently open at its lower surface. The housing can additionally be provided at its opposite side surfaces with left and right side chambers having respective left and right side covers which can be opened outwards. Contained in the housing are various parts, such as, an air cleaner connected to the intake side of the internal combustion engine, a fuel filler aperture at the front upper surface of the fuel tank, a subsidiary tank for a radiator for engine cooling, and a casing for tools or other articles, electric parts, and the like. It is also preferable in this case for the upper cover to be provided at both its side edges with engaging edges bent to project downwards so that when the side covers are closed and thereafter the upper cover is closed, the engaging edges may be brought in engagement from the outside with upper edges of the side covers. The upper cover can be provided with a locking means for locking the same in its closed position.

BRIEF DESCRIPTION OF THE DRAWING

FIGS. 3 and 4 are sectional views taken respectively along lines III — III and IV — IV in FIG. 2.

DETAILED DESCRIPTION

Figure 1:
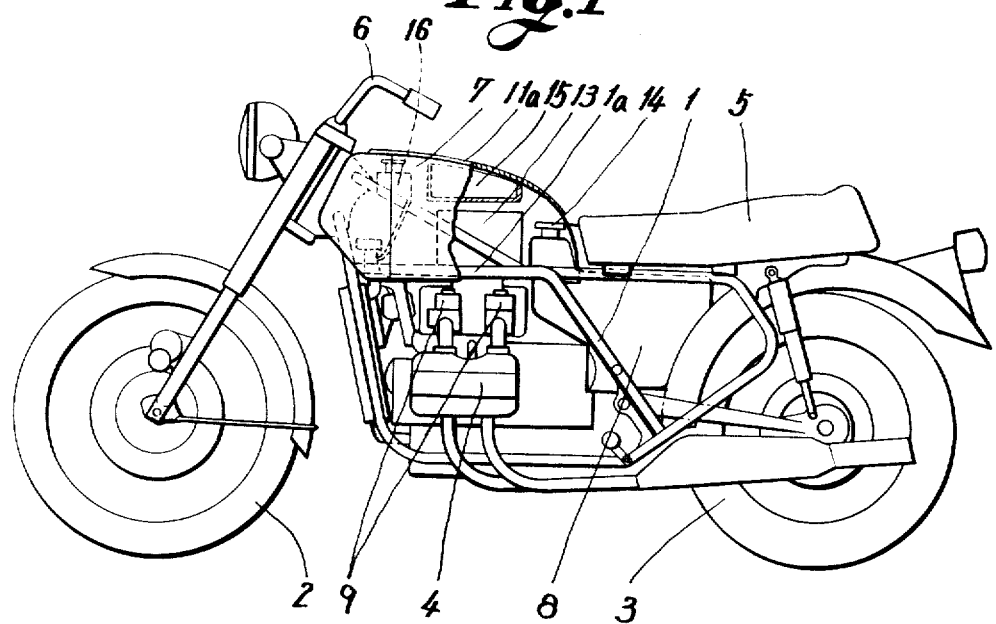
FIG. 1 is a side view, partly in section, of one embodiment according to this invention.
Figure 2:
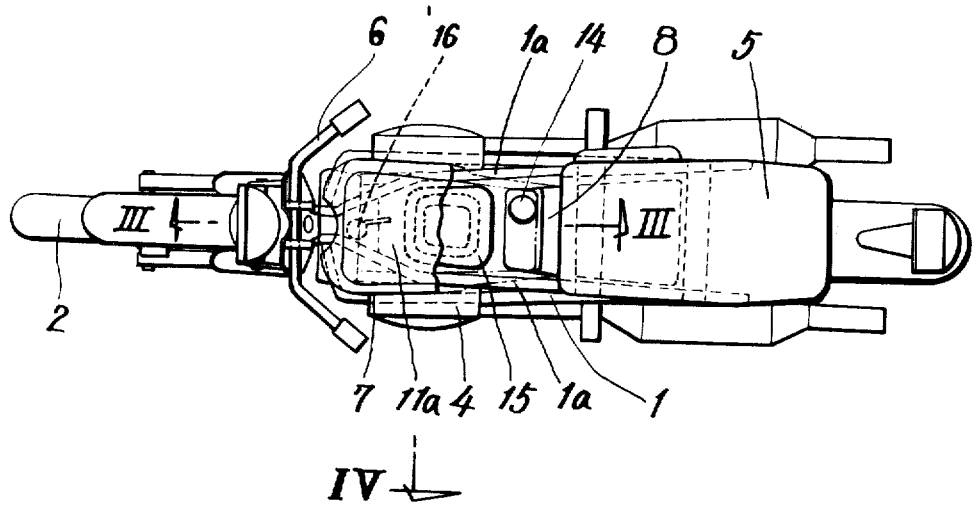
FIG. 2 is a top plan view thereof, partly in section.

Referring to the drawings, numeral 1 denotes a frame of the vehicle body of pipe frame type, and in almost the same manner as is conventional, the vehicle body frame 1 is provided with a front wheel 2, a rear wheel 3, an internal combustion engine 4 at its lower middle portion with a driver's seat 5 at its upper rear portion and a steering handle 6 at its front portion.

It has been conventional in this type of vehicle for the fuel tank to be disposed on the upper portion of the frame 1 between the seat 5 and the steering handle 6. According to this invention, however, a frame housing 7 which is similar in shape to the conventional fuel tank is disposed at that position, at which the fuel tank has been hitherto disposed, and the fuel tank 8 is positioned within a space formed within the vehicle frame 1 at a position below the seat 5.

The engine 4 is of a flat or V shape which laterally extends to the right and left so as to be substantially symmetrical, and a carburetor 9 is provided above the engine.

The frame housing 7 comprises a middle chamber 11 formed between a pair of left and right side plates or partitions 10, secured to a pair of left and frame side frome pipes 1a which constitute the vehicle body frame 1, and left and right side chambers 12 formed on the opposite outsides thereof. The middle chamber 11 has an upper cover 11a pivotably connected at its upper surface which can be opened upwards as shown in dotted lines in FIG. 3, and an opening 11b on its bottom surface. The side chambers 12 have left and right side covers 12a pivotably mounted on both outside surfaces thereof which can be opened sidewards as shown in dotted lines in FIG. 4.

Various parts can be contained in the frame housing 7. Namely, as illustrated in the drawings, there are provided in housing 7, for instance, an air cleaner 13 connected to the upper portion of the carburetor 9, a fuel filler opening 14 formed in the front upper surface of the fuel tank 8, casing 15 for tools and other articles, a subsidiary tank 16 for a radiator, in the case where the engine 4 is cooled by water, and electric equipment 17 and the like.

The upper cover 11a is provided at both its side edges with engaging edges 11c bent to project downwards, so that when the side covers 12a are closed and then the upper cover 11a is closed, the engaging sides 11c are in engagement from the outside with upper edges 12b of the side covers 12a. Thereby, the side covers 12a can be opened only when the upper cover 11a is brought to its open position. Additionally, the upper cover 11a can be provided, as desired, with a locking means (not illustrated) for locking it in its closed position. Thus, the locking means can also serve to lock the side covers 12a.

Thus, according to this invention, the frame housing is mounted on the vehicle body between the seat and the steering handle and is adapted for containing various parts, so that the housing can be opened at its upper surface and additionally at both its side surfaces whereby the driver can observe from a seated position the various parts in front of him and thus inspection, replacement, etc. of these parts can be easily and simply carried out. In further accordance with this invention, the engine and the fuel tank which are comparatively heavy are disposed at a lowered position on the frame of the vehicle body, so that the overall center of gravity of the vehicle body can be lowered and the driving stability thereby improved.

In further accordance with the invention, by forming the opposite side edges of the upper cover with the engaging edges cooperating with the upper edges of the side covers so that the side covers can be opened only when the upper cover is opened, the locking means can serve to lock all the covers and the construction can be simplified.

What is claimed is:

1. In a motorized two-wheeled vehicle having a frame, a front wheel, a rear wheel, a driver's seat at the upper middle portion of the frame, a steering handle at the front portion of the frame, an internal combustion engine mounted on said frame, and a fuel tank mounted on said frame below said seat, an improvement comprising a housing secured to the frame between the seat and the steering handle at a location above the engine such that the engine is exposed therebeneath, said housing being adapted for enclosing various parts therein, said housing having at least one chamber with an upper surface, an upper cover pivotably mounted at said upper surface to be opened upwards, said housing being open at its bottom surface, said parts in said housing including an air cleaner connected to the internal combustion engine below said housing and introduced into the housing through the open bottom surface.

2. A motorized two-wheeled vehicle as claimed in claim 1 comprising a fuel filler for said fuel tank introduced into said housing through said open bottom surface.

3. A motorized two-wheeled vehicle as claimed in claim 1 wherein said one chamber is a middle chamber, said housing also having left and right side chambers on opposite lateral sides of the middle chamber, and respective side covers pivotably mounted at said side chambers to be opened sidewards.

4. A motorized two-wheeled vehicle as claimed in claim 3 wherein said parts in said housing further include a fuel filler for the fuel tank, a subsidiary tank for a radiator of the engine, and a casing for tools or the like.

5. A motorized two-wheeled vehicle as claimed in claim 3, wherein the upper cover has opposite side edges with engaging edges bent downwards so that when the side covers are closed and then the upper cover is closed, the engaging edges are brought into lateral engagement with upper edges of said side covers.

6. A motorized two-wheeled vehicle as claimed in claim 1, comprising partition means secured to said frame and dividing said housing into a plurality of chambers.

7. A motorized two-wheeled vehicle as claimed in claim 6, wherein said frame includes side frame members and said partition means comprises side plates secured to side frame members.

8. A motorized two-wheeled vehicle as claimed in claim 1, wherein the internal combustion engine includes portions which extend laterally to the left and right of the frame, and a carburetor is provided above the engine.

* * * * *